United States Patent [19]

Villata

[11] Patent Number: 4,754,856

[45] Date of Patent: Jul. 5, 1988

[54] HYDRAULICALLY CONTROLLED BRAKE

[75] Inventor: Gino Villata, Buttigliera D'Asti, Italy

[73] Assignee: Valeo, Paris, France

[21] Appl. No.: 604,604

[22] Filed: Apr. 27, 1984

Related U.S. Application Data

[63] Continuation of Ser. No. 323,590, Nov. 20, 1981, abandoned.

[30] Foreign Application Priority Data

Nov. 28, 1980 [FR] France .................. 80 25257

[51] Int. Cl.4 .......................................... F16D 55/228
[52] U.S. Cl. .................................. 188/72.5; 188/370; 92/169
[58] Field of Search ............ 188/72.5, 72.4, 369, 188/370, 352; 92/169

[56] References Cited

U.S. PATENT DOCUMENTS

| | | | |
|---|---|---|---|
| 1,985,812 | 12/1934 | Banas | 188/352 X |
| 2,541,031 | 2/1951 | Butler | 188/370 |
| 2,635,714 | 4/1953 | Butler | 188/370 X |
| 2,756,848 | 7/1956 | Hillegass | 188/72.5 X |
| 2,942,694 | 6/1960 | Burnett | 188/370 X |
| 2,957,553 | 10/1960 | Chouings et al. | 188/370 X |
| 3,125,187 | 3/1964 | Dotto | 188/351 |
| 3,396,824 | 8/1968 | Meier | 188/72.5 |
| 3,675,743 | 7/1972 | Thompson | 188/72.5 |
| 4,377,966 | 3/1983 | Parker et al. | 82/169.3 |

FOREIGN PATENT DOCUMENTS

| | | |
|---|---|---|
| 2309330 | 9/1973 | Fed. Rep. of Germany . |
| 1343662 | 10/1963 | France . |
| 2314399 | 1/1977 | France . |
| 716067 | 9/1954 | United Kingdom . |
| 772700 | 4/1957 | United Kingdom . |
| 2087495 | 5/1982 | United Kingdom . |

Primary Examiner—George E. A. Halvosa
Attorney, Agent, or Firm—Young & Thompson

[57] ABSTRACT

A hydraulically controlled brake comprises a rotatable disc straddled by two opposite hydraulic cylinder bodies, fastened together by fixing means. In each body is slidably mounted a piston which defines in the body a hydraulic chamber, the pistons being adapted to urge a respective brake pad into frictional engagement with said disc when hydraulic pressure is generated in the chambers. The chambers are fed by a conduit, at least a portion of which crosses the interface which is between the assembled cylinder bodies at a location coincidental with the point where the fixing means cross that interface. Thus, there is no need for two separate conduits to feed the two chambers, which are instead fed by a single conduit.

6 Claims, 3 Drawing Sheets

HYDRAULICALLY CONTROLLED BRAKE

This application is a continuation of application Ser. No. 323,590, filed 11/20/81, abandoned.

BACKGROUND OF THE INVENTION

The present invention relates to a hydraulically controlled brake comprising at least one rotatable part, two opposite cylinder bodies assembled by fixing means and straddling the rotatable part, two pistons mounted to slide respectively in the two cylinder bodies and defining hydraulic chambers in said bodies, and two friction elements designed to grip the rotatable part under the thrust of the pistons in response to generation of pressure in the hydraulic chambers.

In brakes of this type which have two opposite cylinder bodies, the circuit feeding the hydraulic chambers is generally complicated by the fact that the two cylinder bodies are located on either side of the rotatable part.

It is an object of the present invention to provide a hydraulically controlled brake of the type mentioned, in which the feed to the hydraulic chambers is simplified, while ensuring a convenient construction and operation substantially free of risks.

SUMMARY

According to the invention, a hydraulically controlled brake of the type mentioned above is characterised in that the hydraulic chambers are fed via a conduit, at least a portion of which crosses an interface for assembly of the two cylinder bodies and is incorporated in the means for fixing together these cylinder bodies.

By means of this arrangement, it is no longer necessary to provide two separate feeds located on either side of the rotatable part and intended respectively for the two hydraulic chambers, but a single feed which serves both hydraulic chambers, because of the conduit portion which is incorporated in the fixing means and which crosses the assembly interface for the two cylinder bodies.

Preferably, an annular sealing gasket is arranged along the assembly interface for the two cylinder bodies and extends around the means for fixing together said cylinder bodies.

In one embodiment, the means for fixing together the two cylinder bodies comprise at least one screw engaged in a passage through the two cylinder bodies.

In this case, the conduit portion which is incorporated in the fixing means can be provided by an annular gap round the screw formed by a region of the passage being of increased diameter, or a portion of reduced diameter of the screw and/or provided by a channel through said screw. This channel advantageously is open at at least one of the ends of the screw for feeding the hydraulic chambers.

In one embodiment of the invention, the fixing means assemble the two cylinder bodies not only one with the other, but also with a support adjacent to one of the cylinder bodies.

In this case, there is advantageously an arrangement according to which the conduit portion incorporated in the fixing means crosses not only the assembly interface for the two cylinder bodies, but also an interface for assembling the support with the adjacent cylinder body, for feeding the hydraulic chambers from the support.

According to another embodiment, when the fixing means comprise at least one screw, the conduit portion incorporated in the fixing means advantageously extends through the screw as far as a head of the screw and is closed by a detachable bleed plug mounted in said head.

The present invention applies to brakes which have a single rotatable part and also to brakes having two or more rotatable parts.

When the brake has two rotatable parts, two outer cylinder bodies and an intermediate double cylinder body, the conduit for feeding the various hydraulic chamber advantageously constitutes a circuit possessing portions which are incorporated in means for fixing the three cylinder bodies, in means for fixing the intermediate cylinder body to one of the outer cylinder bodies and in means for fixing the intermediate cylinder body to the other outer cylinder body.

DESCRIPTION OF THE PREFERRED EMBODIMENTS

Figure 1:
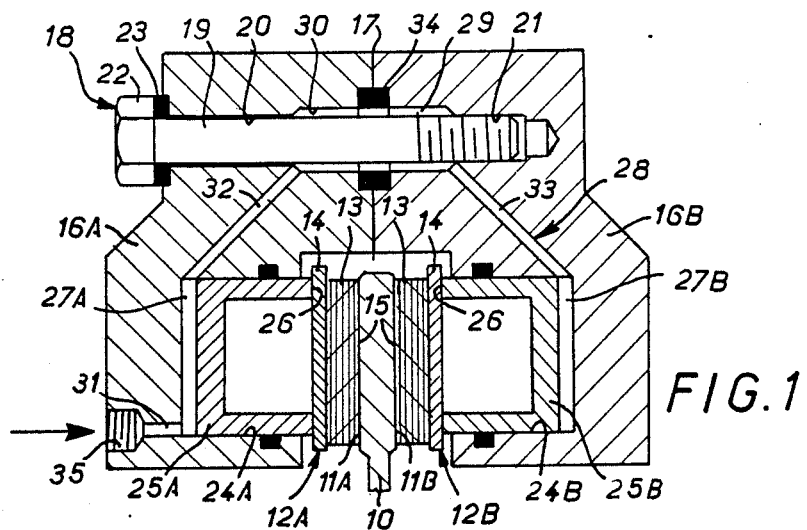
FIG. 1 is a general diagrammatic view of a disc brake according to the invention, in a section through a plane passing through the axis of the brake.

Reference will be made first to FIG. 1 which relates, by way of non-limiting example, to an application of the invention to a hydraulically controlled disc brake, especially for a motor vehicle.

FIG. 1 shows at 10 the rotatable part of the brake, which comprises a disc having two opposite rotating tracks 11A and 11B. Each rotatable track 11A, 11B is adapted to engage frictionally a friction element 12A, 12B, respectively, each comprising a brake pad. Each pad 12A, 12B comprises a lining 13 made of a friction material secured to a support 14.

Each pad 12A, 12B is allowed to rub against the corresponding friction track 11A, 11B of the disc 10 by means of the free surface 15 of the lining 13, which is that surface of the lining remote from its support 14.

Stress is transmitted via the support 14 to each pad 12A, 12B to clamp the latter against the disc 10. The brake comprises two opposite bodies 16A and 16B in which the pads 12A and 12B are mounted respectively. The two bodies 16A and 16B have an assembly interface 17 substantially in the same plane as the disc 10, so that the bodies 16A and 16B straddle the disc 10. The two bodies 16A and 16B are assembled one with the other by fixing means designated generally by 18.

The fixing means 18 comprise at least one screw 19 which is engaged in a passage 20 in the two bodies 16A and 16B. The passage 20 includes a threaded portion 21 in one of the two bodies, for example the body 16B in the case of FIG. 1. The screw 19 is screwed into this threaded portion 21. The screw 19 has, opposite the threaded portion 21, a head 22 which abuts the other body, that is to say the body 16A in the case of FIG. 1, by means of a sealing washer 23.

Each body 16A, 16B acts as the body of a cylinder 24A, 24B in which a piston 25A, 25B is mounted to slide.

The piston 25A, 25B has an outer face 26, which is annular in the example in FIG. 1, and by means of which it is allowed to push on the support 14 of the respective pad 12A, 12B. The piston 25A, 25B defines in the cylinder 24A, 24B a control chamber 27A, 27B which is filled with hydraulic fluid.

The rotatable part, comprising the disc 10, is thus designed to be gripped between the two friction elements formed by the pads 12A and 12B under the thrust of the pistons 25A and 25B in response to pressure being generated in the hydraulic chambers 27A and 27B.

The hydraulic chambers 27A and 27B are fed via a conduit 28, at least a portion 29 of which crosses the assembly interface 17 for the two bodies 16A and 16B and is incorporated in the fixing means 18.

In the example in FIG. 1, the portion 29 of the conduit 28 comprises an annular gap 30 round the screw 19, the gap being provided by a region of the passage 20 being of increased diameter.

The conduit 28 also comprises a feed channel 31 communicating with one of the chambers 27A and 27B, for example the chamber 27A. A channel 32 communicates the chamber 27A with the annular gap 30, whilst a channel 33 communicates this annular gap 30 with the other chamber 27B.

An annular sealing gasket, arranged along the interface 17 round the fixing means 18, may be seen at 34.

The channel 31 constitutes a means for admitting the hydraulic pressure into the enclosure 27A, 32, 30, 33 and 27B and is designed to be connected at 35 to a pipe for supplying the hydraulic pressure.

For braking, a hydraulic pressure is admitted via the channel 31 into the enclosure 27A, 32, 30, 33 and 27B, thus pushing the pistons 25A and 25B against the pads 12A and 12B and ensuring that the disc 10 is clamped by gripping it between the pads 12A and 12B.

It will be understood that the brake which has just been described comprises two hydraulic chambers 27A and 27B which are located on either side of the rotating member 10, and, in spite of that, because the fixing means 18 crossing in the interface 17 are put to use, it is sufficient to provide, instead of two feed pipes intended respectively for the two chambers 27A and 27B, only a single pipe which is connected at 35 to the channel 31.

The construction is thus simplified considerably. Excellent sealing conditions are obtained because of the gasket 34 and the washer 23. The brake is therefore substantially free of operating risks.

In an alternative form (FIG. 2) the portion 29 of the conduit 28 which crosses the assembly interface 17 is provided by a widened region of the passage 20, as in FIG. 1. However, a sealing sleeve 60 is located in this widened region and surrounds the screw 19, the portion 29 of the conduit 28 surrounding the sleeve 60. The sleeve 60 is associated with sealing gaskets 61 and 62 which engage the bodies 16A and 16B. If necessary, the sleeve 60 enables the screw 19 to be removed without causing a leak in the hydraulic circuit 32, 30 and 33.

In another alternative form (FIG. 3), the portion 29 of the conduit 28 is defined not by the widening of the passage 20, but, instead by a reduced diameter portion 63 of the screw 19.

Figure 2:
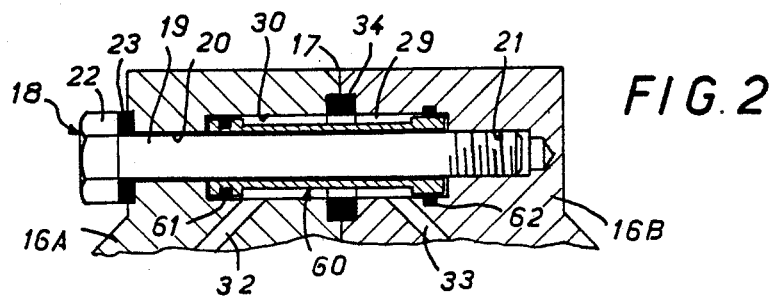
FIGS. 2, 3, 4, and 5 are views similar to FIG. 1, but relating respectively to four alternative forms.
Figure 3:
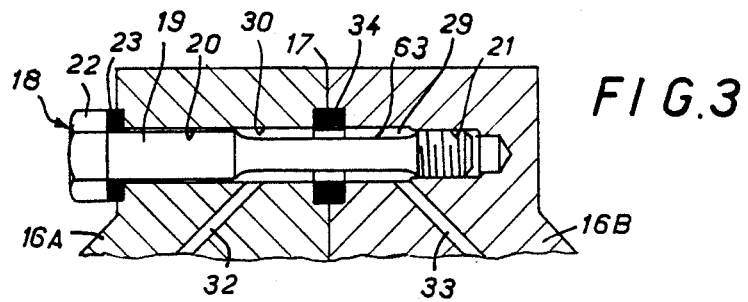
Figure 4:
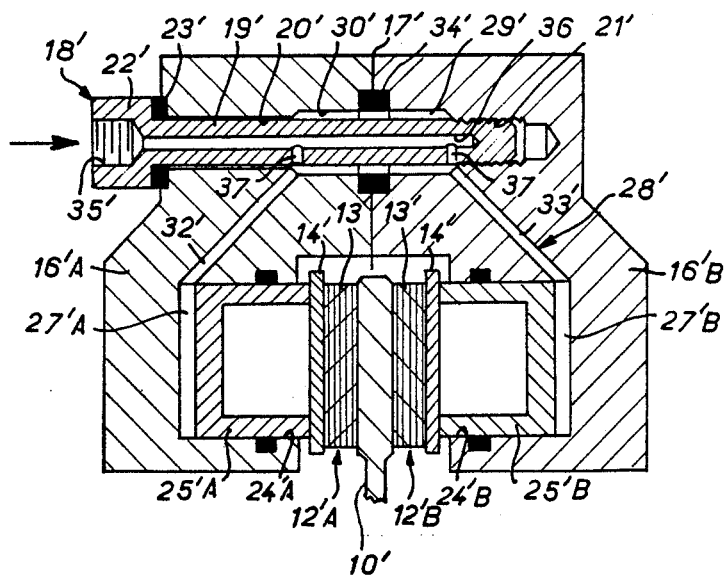

Reference will now be made to FIG. 4 where the arrangement is similar to that described with reference to FIG. 1 or FIG. 2 or to FIG. 3 and where the same reference numerals designate similar elements and are followed by a single dash. The feed connection 35' is associated not with one of the chambers 27'A or 27'B, but with the head 22' of the screw 19'.

In this case, the portion 22' of the conduit 28' which is incorporated in the fixing means 18' comprises not only the annular gap 30' made round the screw 19' but also a channel 36 which is made longitudinally through the screw 19' and which extends up to the head 22' of the screw 19', communicating with the connection 35'. This channel 36 is connected to radial perforations 37 which cause it to communicate with the annular gap 30'.

As in FIG. 1, the hydraulic chambers 27'A and 27'B are fed via a single connection which, in the example in FIG. 4, is formed by the connection 35' made in the head 22' of the screw 19'.

Operation is similar to that described previously.

In another alternative form (FIG. 5), the same reference numerals designate similar elements, but are followed by a double dash. The fixing means 18" assemble the two bodies 16"A and 16"B not only one with the other, but also with a support 38. This support 38 is adjacent to one of the bodies 16"A, 16"B, for example the body 16"B in the case of FIG. 5. The interface for assembling the support 38 with the body 16"B may be seen at 39. The interface 39 is parallel to the interface 17" and spaced from the latter.

The portion 29" of the conduit 28" which crosses the interface 17" and is incorporated in the fixing means 18" also crosses the interface 39.

Figure 5:
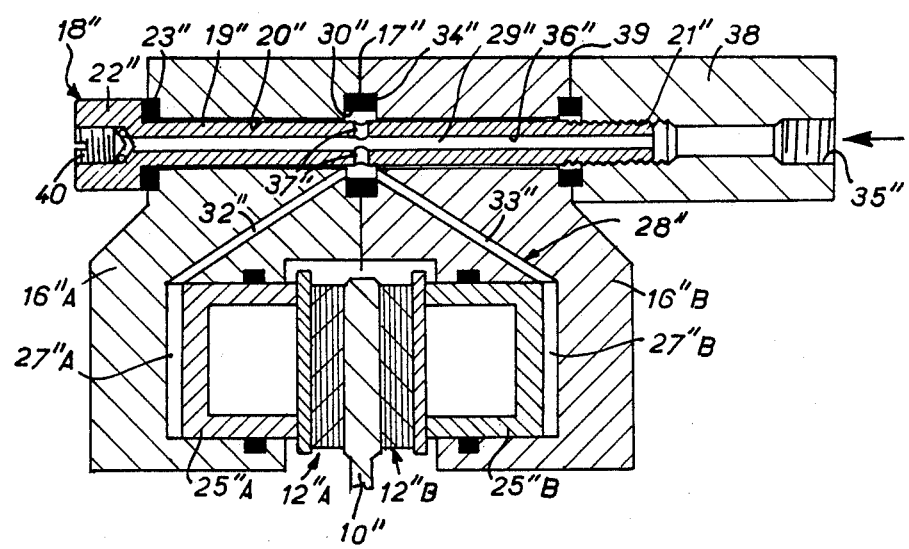

In the example illustrated in FIG. 5, the fixing means 18" comprise a screw 19", the head of which may be seen at 22". The screw 19" is engaged in a passage 20" made in the bodies 16"A and 16"B and in the support 38. Here, the threaded part 21" of the passage 20" is made in the support 38.

The portion 29" of the conduit 28" comprises the annular gap 30" round the screw 19" and crosses the interface 17". The annular sealing gasket arranged along the interface 17" around the fixing means 18" may be seen at 34".

The portion 29" of the conduit 28" also comprises a channel 36" made longitudinally in the screw 19" from one end to the other of the screw. Radial perforations which cause this channel 36" to communicate with the annular gap 30" may be seen at 37". Feeding is carried out via the connection 35" which is here located in the support 38. The connection 35" communicates with the channel 36" of the screw 19". The channel 36" is closed, opposite the connection 35", by a detachable bleed plug 40 mounted, for example by screwing, in the head 22" of the screw 19".

Operation is similar to that described previously.

Figure 6:
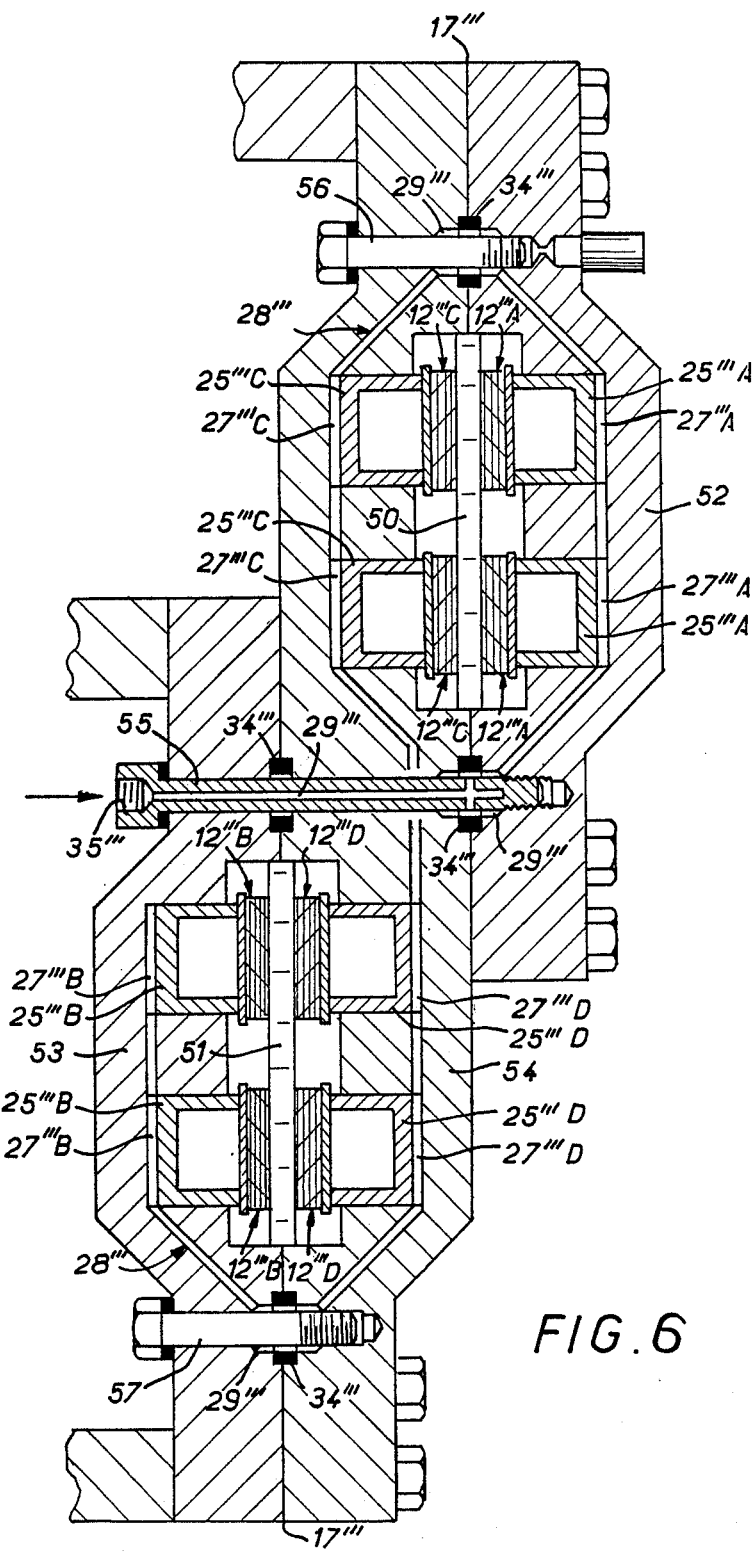
FIG. 6 is a general diagrammatic view of a double-disc brake according to the invention, in a circumferential cross-section.

Reference will now be made to FIG. 6 which relates to an application of the invention to a double-disc brake. The same reference numerals designate similar elements and are followed by a triple dash.

This brake comprises two discs 50 and 51, two outer bodies 52 and 53 and an intermediate body 54.

The outer body 52 comprises two hydraulic chambers 27'''A. The outer body 53 comprises two hydraulic chambers 27'''B. The intermediate body 54 is double and comprises two hydraulic chambers 27'''C which extend opposite the chambers 27'''A, and two hydraulic chambers 27'''D which extend opposite the hydraulic chambers 27'''B.

The feed conduit 28'''' for the various hydraulic chambers 27''''A, 27''''B, 27''''C and 27''''D constitutes a circuit, the feed connection of which may be seen at 35'''.

Means for fixing together the three bodies 52, 53 and 54 may be seen at 55, means for fixing together the two bodies 52 and 54 may be seen at 56 and means for fixing the two bodies 53 and 54 may be seen at 57.

The feed circuit 28''' contains portions 29''' which, as before, are incorporated in the various fixing means 55, 56 and 57. The incorporation of these portions 29''' of the circuit 28''' in the fixing means 56 and 57 is of the type illustrated in FIG. 1, whilst the incorporation of the portion 29''' of the circuit 28''' of the fixing means 55 is of the type illustrated in FIG. 5.

Operation is similar to that previously described.

I claim:

1. In a hydraulically controlled brake comprising at least one rotatable part; two opposite cylinder bodies which straddle the rotatable part; fixing means assembling the two cylinder bodies together, said fixing means crossing an interface which is between the two assembled cylinder bodies; two pistons mounted to slide respectively one in each of said two cylinder bodies and defining hydraulic chambers in said bodies; two friction elements adapted to grip the rotatable part under the thrust of the pistons in response to generation of pressure in the hydraulic chambers; and conduit means feeding the hydraulic chambers; the improvement in which at least a portion of said conduit means crosses the assembly interface which is between the two assembled cylinder bodies coincidentally with said fixing means, said fixing means being elongated and detachably interconnecting said bodies and having an end that extends through the outer surface of one of said bodies, said fixing means comprising at least one screw engaged in a passage through the two cylinder bodies, said conduit portion comprising an annular gap which surrounds the screw, said gap being provided by a region of the passage of increased diameter, said screw being devoid of hydraulic fluid carrying passageways therethrough.

2. A brake according to claim 1, wherein a sealing sleeve is located in said region of the passage of increased diameter.

3. A brake according to claim 1, wherein said screw has a threaded portion, a head portion and a smooth shank therebetween, said shank portion and said threaded portion being of substantially constant diameter.

4. A brake according to claim 3, wherein said screw is a standard machine screw.

5. In a hydraulically controlled brake comprising at least one rotatable part; two opposite cylinder bodies which straddle the rotatable part; fixing means assembling the two cylinder bodies together, said fixing means crossing an interface which is between the two assembled cylinder bodies; two pistons mounted to slide respectively one in each of said two cylinder bodies and defining hydraulic chambers in said bodies; two friction elements adapted to grip the rotatable part under the thrust of the pistons in response to generation of pressure in the hydraulic chambers; and conduit means feeding the hydraulic chambers; the improvement in which at least a portion of said conduit means crosses the assembly interface which is between the two assembled cylinder bodies coincidentally with said fixing means, said fixing means being elongated and detachably interconnecting said bodies and having an end that extends through the outer surface of one of said bodies, said fixing means comprising at least one screw engaged in a passage through the two cylinder bodies, said conduit portion comprising an annular gap which surrounds the screw, said gap being provided by a region of the screw of reduced diameter, said screw being devoid of hydraulic fluid carrying passageways therethrough.

6. A brake according to claim 5, in which an annular sealing gasket is disposed along said interface and around said fixing means.

* * * * *